(12) United States Patent
Greenway

(10) Patent No.: US 9,488,457 B2
(45) Date of Patent: Nov. 8, 2016

(54) ROOFING MEASURING DEVICE

(76) Inventor: Joseph Greenway, Columbus, NC (US)

( * ) Notice: Subject to any disclaimer, the term of this patent is extended or adjusted under 35 U.S.C. 154(b) by 0 days.

(21) Appl. No.: 13/252,112

(22) Filed: Oct. 3, 2011

(65) Prior Publication Data

US 2012/0079734 A1    Apr. 5, 2012

Related U.S. Application Data

(60) Provisional application No. 61/389,689, filed on Oct. 4, 2010.

(51) Int. Cl.
*G01B 3/10* (2006.01)
*E04D 15/02* (2006.01)

(52) U.S. Cl.
CPC ........... *G01B 3/1082* (2013.01); *E04D 15/025* (2013.01); *G01B 3/1041* (2013.01)

(58) Field of Classification Search
CPC ................. G01B 3/10; G01B 3/1084; G01B 2003/1089; G01B 3/1041; G01B 3/1071
USPC ........................................ 33/755, 759, 679.1
See application file for complete search history.

(56) References Cited

U.S. PATENT DOCUMENTS

| | | | | |
|---|---|---|---|---|
| 3,270,421 A | * | 9/1966 | Jones | 33/759 |
| 3,664,026 A | * | 5/1972 | Lawson | 33/759 |
| 4,301,596 A | * | 11/1981 | Sedlock | 33/494 |
| 4,574,486 A | * | 3/1986 | Drechsler | 33/765 |
| 5,724,747 A | * | 3/1998 | Poorman | 33/759 |
| 6,145,215 A | * | 11/2000 | Graston et al. | 33/759 |
| 6,470,582 B1 | * | 10/2002 | Renko | 33/494 |
| 6,523,275 B2 | * | 2/2003 | Medford et al. | 33/759 |
| 6,530,159 B2 | * | 3/2003 | Tarver, III | 33/759 |
| 6,598,310 B1 | * | 7/2003 | Odachowski | 33/755 |
| 6,684,522 B2 | * | 2/2004 | Chilton | 33/759 |
| 8,720,077 B1 | * | 5/2014 | Fallisgaard | 33/759 |
| 2002/0148134 A1 | * | 10/2002 | Meyer et al. | 33/758 |
| 2004/0168334 A1 | * | 9/2004 | Tripp | 33/759 |
| 2004/0172846 A1 | * | 9/2004 | McRae | 33/760 |
| 2005/0223578 A1 | * | 10/2005 | Scarborough | 33/451 |
| 2007/0283589 A1 | * | 12/2007 | Garcia | 33/758 |
| 2008/0141549 A1 | * | 6/2008 | Brown | 33/755 |
| 2010/0275456 A1 | * | 11/2010 | Lord | 33/706 |
| 2011/0167660 A1 | * | 7/2011 | Furrow | 33/759 |
| 2012/0079734 A1 | * | 4/2012 | Greenway | 33/759 |
| 2013/0014400 A1 | * | 1/2013 | Kucik et al. | 33/759 |

* cited by examiner

*Primary Examiner* — Yaritza Guadalupe-McCall
(74) *Attorney, Agent, or Firm* — Michael Ries

(57) ABSTRACT

A retractable measuring tape with a distal end and a pair of edges and a front clip disposed on the distal end of and a plurality of conspicuous measurement indicia that includes a pair of arrows pointing outward on the edges of the retractable measuring tape to indicate where to place and produce a chalk line utilized by a roofing professional. The device also includes a metal square-shaped casing with a front portion that houses the retractable measuring tape and a retraction spring that retracts the retractable measuring tape and a lock button that is disposed on the front portion of the casing that is integral to the retraction spring. The arrows are an alternating pair of solid arrows and a pair of duel arrows and can also be black or red to provide additional conspicuousness.

6 Claims, 3 Drawing Sheets

ROOFING MEASURING DEVICE

This application claims priority to U.S. Provisional Application 61/389,689 filed on Oct. 4, 2010, the entire disclosure of which is incorporated by reference.

TECHNICAL FIELD & BACKGROUND

Properly marking off a roof is no easy task. It is important for roofers to determine the correct amount of reveal space and that they stay consistent to these measurements. If errors are made during this process shingles may be laid unevenly. This is a costly and time consuming mistake that no professional roofer, nor homeowner, wants to deal with. Many roofers lay chalk lines on a 5½" reveal but this can become confusing after 99" when using a standard 100" tape measure. It's possible to increase the reveal, which would require the use of fewer materials however measuring for this can be a challenge.

It is an object of the invention to provide a roof measuring device that allows roofers to quickly and consistently measure roofs for the installation of shingles.

It is an object of the invention to provide a roof measuring device that saves a user time because it helps to calculate proper spacing intervals on a roofing surface.

It is an object of the invention to provide a plurality of marks that are predetermined and easy to read eliminating confusion between crewmembers.

What is really needed is a roof measuring device that allows roofers to quickly and consistently measure roofs for the installation of shingles that saves a user time because it helps to calculate proper spacing intervals on a roofing surface that are predetermined and easy to read eliminating confusion between crewmembers.

BRIEF DESCRIPTION OF THE DRAWINGS

The present invention will be described by way of exemplary embodiments, but not limitations, illustrated in the accompanying drawing in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1A:
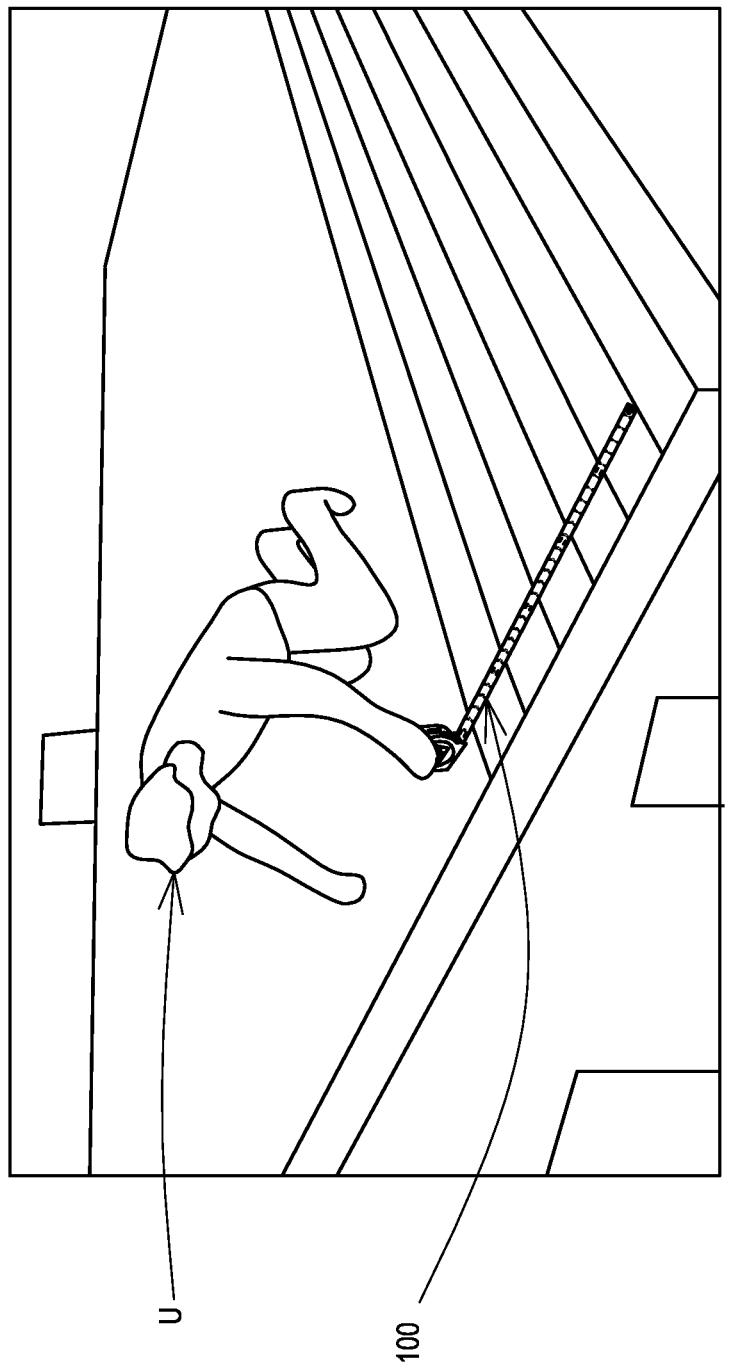
FIG. 1A illustrates an environmental perspective view of a roofing measuring device, in accordance with one embodiment of the present invention.

FIG. 1A illustrates an environmental perspective view of a roofing measuring device 100, in accordance with one embodiment of the present invention.

The roofing measuring device 100 is typically utilized to allow a user U to relatively easily mark-off incremental lines reflecting predetermined distances where roofing shingles are to be attached to a roof. The roofing measuring device 100 is typically a retractable metal tape measure with critical modified indicia. The predetermined distances can be in standard American units such as inches or feet or metric units such as centimeters.

Figure 1B:
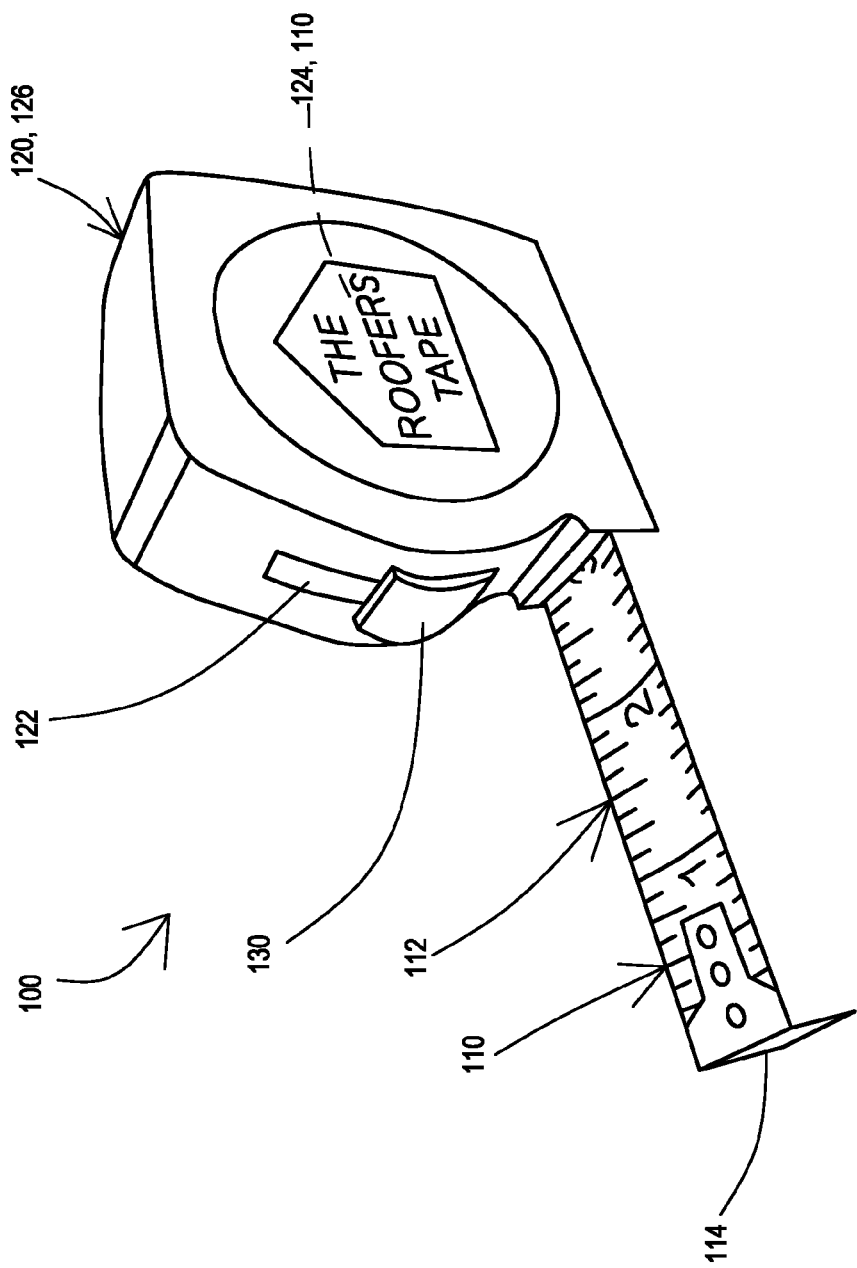
FIG. 1B illustrates a side perspective view of a roofing measuring device, in accordance with one embodiment of the present invention.

FIG. 1B illustrates a side perspective view of a roofing measuring device 100, in accordance with one embodiment of the present invention.

The roofing measuring device 100 includes a retractable measuring tape 110, a casing 120 and a lock button 130. The retractable measuring tape 110 is typically made of flexible metal material although the retractable measuring tape 110 can be made of any suitable material. The retractable measuring tape 110 has a plurality of conspicuous measurement indicia 112 typically utilized by roofing professionals in addition to typical measurement indicia that includes a plurality of numbers that indicate a plurality of predetermined distances in inches and feet from a front clip 114 of the retractable measuring tape 110. The conspicuous measurement indicia 112 is described and illustrated in greater detail in FIG. 1C and its description. The front clip 114 can be utilized to hold the retractable measuring tape 110 from an edge or other suitable area or object. The casing 120 has a front portion 122 and houses the retractable measuring tape 110 and a retraction spring 124 that retracts the retractable measuring tape 110, although other suitable retraction devices can be utilized to retract the retractable measuring tape 110. The casing 120 is typically made of metal although the casing 120 can be made of other suitable materials as well. The casing 120 is also typically square-shaped 126 for convenient carrying and transport. The lock button 130 is integral to the retraction spring 124 and is depressed to hold an amount of retractable measuring tape 110 extended outward from the casing 120. The lock button 130 can also be released to activate the retraction spring 124 to retract the retractable measuring tape 110 back into the casing 120 as desired by the user. The lock button 130 as illustrated in FIG. 1B is disposed on the front portion 122 of the casing 120 although the lock button 130 can be disposed anywhere on the casing 120.

Figure 1C:
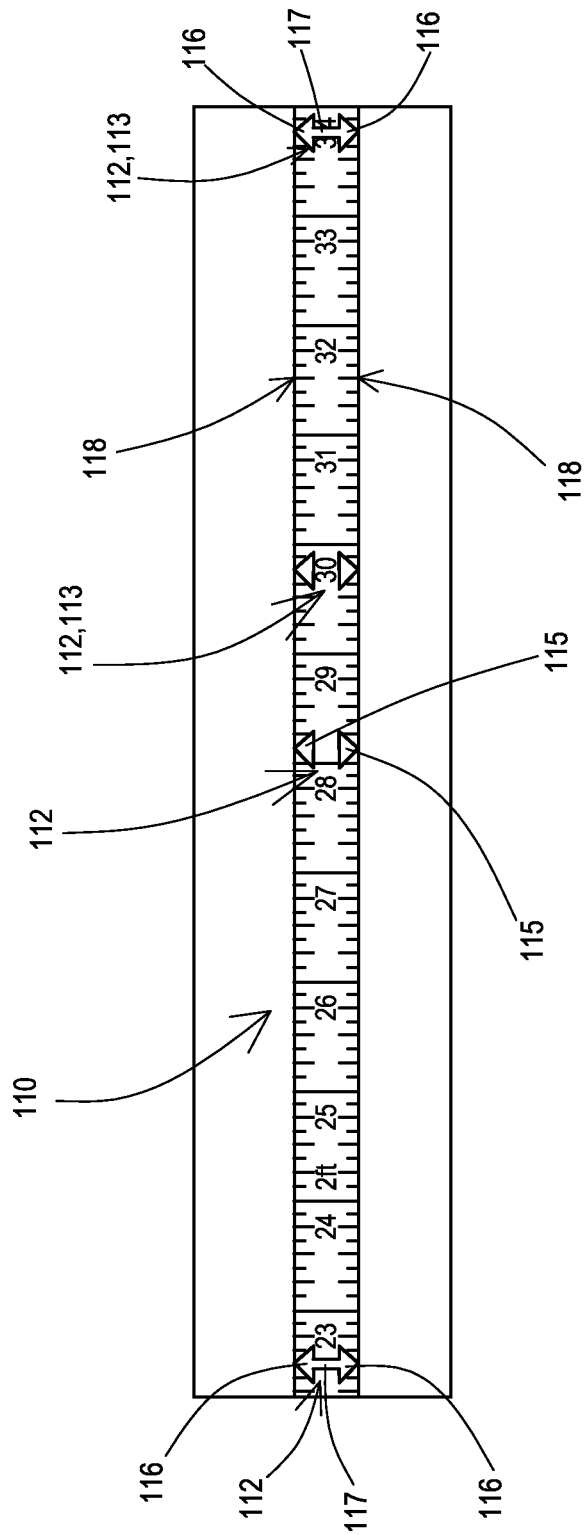
FIG. 1C illustrates a top view of a retractable measuring tape of a roofing measuring device, in accordance with one embodiment of the present invention.

FIG. 1C illustrates a top view of a retractable measuring tape 110 of a roofing measuring device 100, in accordance with one embodiment of the present invention.

As previously described in the description and illustration in FIG. 1B, the retractable measuring tape 110 has a plurality of conspicuous measurement indicia 112 typically utilized by roofing professionals in addition to typical measurement indicia that includes a plurality of numbers that indicate a predetermined distance in inches and feet from a front clip 114 of the retractable measuring tape 110. The conspicuous measurement indicia 112 include a pair of arrows 116 pointing outward on the edge 118 of the retractable measuring tape 110 disposed every approximate 5⅝$^{th}$ inches along the retractable measuring tape 110. The pair of arrows 116 indicate to the user where to place and produce a chalk line (not shown) every 5⅝$^{th}$ inch interval on the roof where shingles are to be attached to the roof. The pair of arrows 116 can also be alternating solid arrows 113 and duel arrows 115 to produce relatively more conspicuousness along the retractable measuring tape 110. The pair of solid arrows 113 includes a line 117 between the pair of arrows 116 and the duel arrows 115 are without a line between the pair of arrows 116. The pair of arrows 116 can also be black or red in color to provide additional conspicuousness.

The roofing measuring device is designed to simplify the process of installing roof shingles by providing roofers with clearly marked intervals important to the process. The product is designed in a manner similar to a standard tape measure and may include a tape, a housing and a lock button. It is used the same as a conventional tape measure. The additional features may be the specific markings on the tape. Measurements may be down to a 1/16" and there may be a series of arrows along the tape. The tape may have a red arrow above and below the 5⅝" mark, indicating to users where they should chalk. The next arrow may be a solid arrow placed at the 11¼" mark. At 16⅞" there may again be a set of red arrows, one above and one below the numbers. The alteration between solid and duel arrows allows for quick marking since most roofers only lay-off every other line. The tape housing may be silver, the lock button may be black, the tape may be yellow and the numbers may be in black or other suitable colors. Colors, dimensions, materials and other specifications may vary upon manufacturing.

The roofing measuring device is a specialized tool design to simplify a complicated metric shingle layout system, since over ninety percent of shingles installed are metric although the roofing measuring device is designed for standard size shingles as well. Roofing contractors who use this tape will save on cost by using less shingles, nails, and labor. The roofing contractors will also save time on laying-off a roof and eliminating mistakes.

The device's main feature is a 5⅝ inch layoff with an arrow point design specifically for laying-off horizontal lines for metric shingles. The tape of the device includes a plurality of solid red arrows every 5⅝ inch interval that extends over the entire length of the tape. Typically the device is used to lay-off a roof for one roofer to hold the tape at a starter line, while the other roofer pulls the tape to the ridge of the roof. Then, the roofers begin to lay-off every other line while moving towards one another. By marking solid arrows only, roofers can achieve this process in a timely manner, without any mistakes. Most roofers today use a standard tape and make a mark every eleven inches. Although, this is easy to understand, and is currently utilized by roofers, it loses one-quarter inch per mark, or one eighth per row resulting in a loss of one or two rows of shingles per roof. There is also a black point at thirty inches that is utilized for the lay-off of a short vertical starter line, or a bond-line on standard three-tab shingles.

The tape utilizes a horizontal starter line and includes a bottom line, which determines where the first row of shingles starts with a lay-off that will vary in the range of 9¾ to 13¼ inches. There are also a plurality of vertical starter lines with two lines marked, one at three-feet, and the other line marked at six-inches before the first mark minus the overhang of shingles. These two lines are for keeping bond lines straight, and are suitable when put close to the center of a roof.

There are lay-offs for twenty-five and thirty-foot tapes. The tape's five and five-eighths inch metric shingle lay-off is a simple system of red points and red arrows, which accommodates all roofers. Most roofers lay-off every other line, so they mark arrows only. However, if a crew prefers to chalk all lines then the red points and red arrows would be marked. The tape has markings on both sides of the tape for easy reading and for marking either side of the roof.

The numbers for the twenty-five foot model include 5⅝, 11¼, 16⅞, 22½, 28⅛, 33¾, 39⅜, 45, 50⅝, 56¼, 61⅞, 67½, 73⅛, 78¾, 84⅜, 90, 95⅝, 101-14, 106⅞, 112½, 118⅛, 123¾, 129⅜, 135, 140⅝, 146¼, 151⅞, 157½, 163⅛, 168¾, 174⅜, 180, 185⅝, 191¼, 196⅞, 202½, 208⅛, 213¾, 219⅜, 225, 230⅝, 236¼, 241⅞, 247½, 253⅛, 258¾, 264⅜, 270, 275⅝, 281¼, 286⅞, 292½ and 298⅛.

Additional numbers for the thirty-foot model include 303¾, 309⅜, 315, 320⅝, 326¼, 331⅞, 337½, 343⅛, 348¾, 354⅜ and 360. The 30 ft. model is typically suited for roofers because the tape measurement and the last red-arrow end together at 360 inches. Utilizing a metric lay-off system verses the standard tape method results in a ⅛ inch gain per row of shingles. This is a gain of 6⅝ inches on the twenty-five foot tape, and 8 inches on the thirty-foot tape. An average savings is two rows of shingles per job, or a savings of one to two bundles of shingles at a cost of $37.00 each (material & labor). The tape should read in inches but can also read in feet and inches and then both measurements are used. The feet markings are used for laying-off horizontal lines for shingles that have a six-inch reveal and long vertical starter lines on standard three tab shingles, and the feet markings can also be utilized to measure roof area. The inches are needed to lay-off long horizontal lines on standard shingles with a five-inch reveal and for carpentry work as well.

There is a plurality of black point lay-offs which are a plurality of black-point measurements for marking short vertical starter lines, which are at six inches before three feet on standard three-tab shingles. This helps to eliminate the need for a user to count backwards or subtract in their head. The numbers indicated on the tape with small black points include 30, 66", 102", 138, 174, 210", 246" and 282" for a twenty-five foot tape and additional black point numbers for the thirty-foot tape that include 318 and 354. The closest the black point lay-offs that come to the red point lay-off are 174, 174⅜, 354 and 354⅜. In order not to congest or complicate the tape, a need for the 16-inch, and 19 3/16 inch lay-off marks found on a standard tape is eliminated. There is no lay-off needed for standard shingles, because they are laid-off at five and ten inches.

In today's economy, companies are looking for ways to cut cost while generating profits. For roofing companies who install shingles the roofing tape device can be a very helpful device. The roofing tape device is tangible and relatively inexpensive compared to traditional similar devices. Second, by using its simplified arrow-point design layoff system a roofing contractor will save on time, materials, and eliminate more mistakes. In addition, the roofing tape device is easy to read and understand, especially for new employees, and is very useful in calculating difficult areas of a complicated roof with dormers, valleys, and any roofs with conflicting measurements. Finally, the roofing tape device is accurate in its design, has a full set of numbers, and is scaled-down to one-sixteenth inch, which makes it adequate for carpentry work necessary on a wide variety of jobs.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A roofing measuring device, comprising:
a retractable measuring tape with a distal end and a pair of edges and a front clip disposed on said distal end and a plurality of conspicuous measurement indicia utilized by a roofing professional, said conspicuous measurement indicia includes a pair of arrows pointing outward on said edges of said retractable measuring tape to indicate where to place and produce a chalk line and said pair of arrows are an alternating pair of solid arrows and a pair of duel arrows to provide additional conspicuousness along said retractable measuring tape, wherein said pair of arrows are black or red to provide additional conspicuousness and said pair of solid arrows includes a line between said pair of arrows and the duel arrows are without a line between the pair of arrows;
a casing with a front portion that houses said retractable measuring tape and a retraction spring that retracts said retractable measuring tape;
a lock button that is disposed on said front portion of said casing that is integral to said retraction spring; and
a plurality of measurement indicia with a plurality of numbers that indicate a plurality of predetermined distances from said front clip of said retractable measuring tape, said predetermined distances are in metric units.

2. The device according to claim 1, wherein said retractable measuring tape is made of flexible metal material.

3. The device according to claim 1, wherein said casing is square-shaped to facilitate carrying and transport.

4. The device according to claim 1, wherein said lock button holds an extended amount of retractable measuring tape outward from said casing.

5. The device according to claim 1, wherein said lock button is depressed to activate said retraction spring to retract said retractable measuring tape back into said casing.

6. A roofing measuring device, comprising:
a flexible metal retractable measuring tape with a distal end and a pair of edges and a front clip disposed on said distal end and a plurality of conspicuous measurement indicia that includes a pair of arrows pointing outward on said edges of said retractable measuring tape to indicate where to place and produce a chalk line utilized by a roofing professional, said pair of arrows is disposed along said retractable measuring tape to indicate where to place and produce said chalk line on a roof where a plurality of shingles are to be attached to said roof and said pair of arrows are an alternating pair of solid arrows and a pair of duel arrows to provide additional conspicuousness along said retractable measuring tape, wherein said pair of arrows are black or red to provide additional conspicuousness and said pair of solid arrows includes a line between said pair of arrows and the duel arrows are without a line between the pair of arrows;
a metal square-shaped casing with a front portion that houses said retractable measuring tape and a retraction spring that retracts said retractable measuring tape;
a lock button that is disposed on said front portion of said casing that is integral to said retraction spring, wherein said lock button is depressed to activate said retraction spring to retract said retractable measuring tape back into said casing and said lock button holds an extended amount of retractable measuring tape outward from said casing; and
a plurality of measurement indicia with a plurality of numbers that indicate a plurality of predetermined distances from said front clip of said retractable measuring tape, wherein said predetermined distances are in inches and feet or metric units.

* * * * *